United States Patent
Domingo

(10) Patent No.: US 9,466,202 B2
(45) Date of Patent: Oct. 11, 2016

(54) TEMPERATURE AND TIME ALARM WRISTBAND

(71) Applicant: Ysabella Domingo, Rosharon, TX (US)

(72) Inventor: Ysabella Domingo, Rosharon, TX (US)

(*) Notice: Subject to any disclaimer, the term of this patent is extended or adjusted under 35 U.S.C. 154(b) by 0 days.

(21) Appl. No.: 14/537,099

(22) Filed: Nov. 10, 2014

(65) Prior Publication Data

US 2016/0133113 A1    May 12, 2016

(51) Int. Cl.
| | |
|---|---|
| *G08B 17/00* | (2006.01) |
| *G08B 21/18* | (2006.01) |
| *G01T 7/00* | (2006.01) |
| *G01W 1/12* | (2006.01) |
| *G04G 21/02* | (2010.01) |
| *G01J 1/42* | (2006.01) |

(52) U.S. Cl.
CPC .............. *G08B 21/182* (2013.01); *G01J 1/429* (2013.01); *G01T 7/00* (2013.01); *G01W 1/12* (2013.01); *G04G 21/02* (2013.01)

(58) Field of Classification Search
CPC ............ G01W 1/12; G01T 1/02; G01T 7/00; G04G 21/02; G01J 1/429
USPC ........... 340/586; 250/336.1; 368/10; 968/411
See application file for complete search history.

(56) References Cited

U.S. PATENT DOCUMENTS

| | | | | |
|---|---|---|---|---|
| 4,733,383 | A * | 3/1988 | Waterbury | G04G 21/02 368/10 |
| 7,205,544 | B2 * | 4/2007 | Bushberg | G01T 7/00 250/336.1 |
| 7,351,985 | B2 * | 4/2008 | Antanouski | G01T 1/02 250/484.5 |
| 7,629,580 | B2 * | 12/2009 | Bushberg | G01T 7/00 250/336.1 |
| 2015/0041663 | A1 * | 2/2015 | Oliver | G01J 1/429 250/372 |

* cited by examiner

*Primary Examiner* — John A Tweel, Jr.
(74) *Attorney, Agent, or Firm* — David McEwing

(57) ABSTRACT

This disclosure pertains to a method and apparatus for monitoring exposure to high temperature and to sunlight. It can be worn by children or adults. The device comprises a temperature measuring component and a timer. The timer can be incorporated into a chronometer. The invention includes setting a time limit for exposure to the sun. It also includes activating an alarm. The alarm can be audible or visual. The alarm will alert the wearer that the selected time period of exposure to the sun has been reached. The alarm may also alert the wearer that the temperature has exceeded a pre-selected level. The device may be solar powered. The housing of the device may be water proof and shock resistant. The functions of the device may also be incorporated into a smart phone. The back of the device or inside the hinged cover can contain safety information or operating instructions.

3 Claims, 1 Drawing Sheet

TEMPERATURE AND TIME ALARM WRISTBAND

FIELD OF USE

The invention pertains to helping a child monitor his or her exposure to the sun or exposure to excessive outdoor heat.

BACKGROUND OF INVENTION

The harmful effects of over exposure to the sun are well known. Sunburn can be painful. Extreme sunburn can have serious consequences for an individual's health. For example, it is understood that skin cancer can develop from over exposure to the sun. There are other consequences from activity in the hot sun. This includes but is not limited to heat stroke or dehydration.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DESCRIPTION OF INVENTION

The disclosure pertains to a method and apparatus for an individual to monitor their exposure to the sun. Although developed with the thought of helping children or youths avoid prolonged exposure to the harmful rays of the sun, the device can be beneficially used by anyone.

Figure 1:
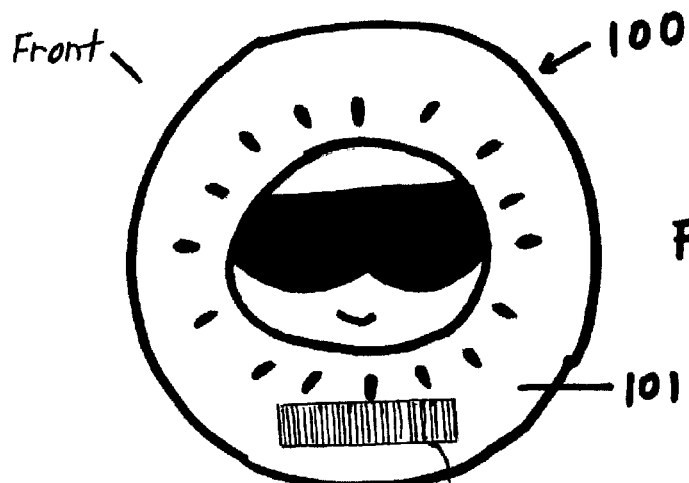
FIG. 1 illustrates the cover protecting the display face of the invention.

FIG. 1 illustrates the apparatus 100 shown in FIG. 1. The fanciful design on the apparatus cover is not part of the invention. The illustration of FIG. 1 also illustrates the outside of the apparatus cover 101.

Figure 2:
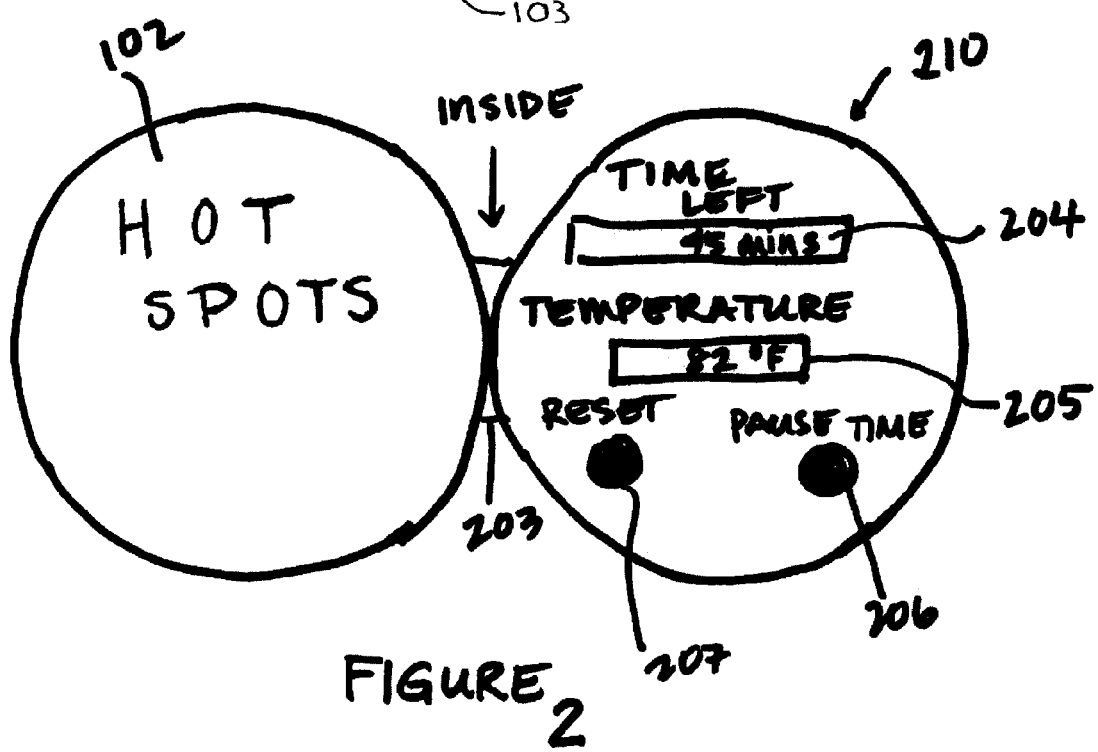
FIG. 2 illustrates the inside of the cover and the display face. Illustrated are the displays and the control functions of one embodiment of the invention. Also illustrated is the hinge for the cover.

FIG. 2 illustrates the apparatus with the cover open showing the interior 102 of the cover. Also illustrated is the hinge 203 allowing the cover to move open or closed. The face of the apparatus 210 shows the time remaining on the timer 204 (measuring the duration of exposure to the sun). Also illustrated is the temperature display 205. The temperature display shows the ambient temperature to which the wearer is exposed. Therefore the wearer would know the temperature in a cooling shade in contrast to an area exposed to direct sunlight. Also illustrated is a reset control 207 and a pause-time control 206.

The apparatus can be worn around the person's wrist. It has a temperature and time component. The component is held in place by the wrist band. In one embodiment, the apparatus may resemble a wrist watch.

The component is contained within a housing. The component housing can be round, oval, square or rectangular. The housing can be constructed of metal or plastic.

Since many outdoor activities are proximate to water, in one embodiment the case is water proof. In another embodiment, the casing is shock proof. This makes the apparatus more rugged for outdoor activities and sports play.

In another embodiment, the power source, i.e., a battery, could be supplemented by a solar power panel. This could be positioned on the apparatus cover or on the body of the apparatus. The solar power panel is illustrated on FIG. 1 103. This supplemental power source would prolong battery life, thereby reducing the number of apparatus batteries requiring disposal. It will be appreciated that the disposal of batteries can have detrimental effects on the environment.

The apparatus includes a temperature sensor. The sensor measures the temperature of the ambient air. The apparatus also includes a clock. It also includes an alarm. In one embodiment the alarm is audible. The alarm may be a light. The light may flash when a time limit or clock time reaches a limit set by the wearer. Included are controls allowing the user to adjust the time. The clock can include a timer. The wearer can set the timer/clock for one hour. The wearer can activate the alarm feature. After a duration of one hour, the alarm is activated. The alarm can be an audible sound and/or a flashing light. In one embodiment, the alarm can also sound if the temperature exceeds a selected limit, e.g. 95° F.

The apparatus includes a display feature. The temperature can be displayed. This can be displayed in a digital format. The display also includes a display of the time. The display can be adjusted to display the time limit determined by the wearer. This can be the remaining time of the time limit selected by the wearer or parent. In this mode, the display shows the timer. The timer can count down the time remaining. In another embodiment the timer can display the amount of time that has elapsed. The clock/timer can have a digital display.

The apparatus can also display the time. The apparatus can function as a clock or chronometer.

In one embodiment, the temperature monitoring device can be controllably turned off and on. For example, if the apparatus is worn as a watch using the clock mode, the wearer may want to save battery life and turn off the temperature function.

The apparatus includes controls for selecting the display format, i.e., timer or clock. The apparatus includes controls for setting or selecting the time duration to be monitored by the timer. Also included is a control feature to activate the alarm. This control may be used to select the method of the alarm, i.e., audible sound or flashing light.

In another embodiment, the apparatus can include a hinged cover to protect the display. The cover can be closed and latched. By pressing the latch, located on the outside surface of the cover, the cover can be opened. The cover is attached to the housing with a hinge. The hinge can contain a spring mechanism to facilitate opening the cover from the housing. It will be appreciated that the cover will protect the apparatus from moisture or shock. The cover may incorporate a switch that activates the display only when the cover is opened. During other times the display component is off. This switch will act to preserve battery life.

In another embodiment, the apparatus can be worn around the wearer's neck. It can also be pinned or clipped onto clothing. The clip can contain a spring.

In yet another embodiment, the device can comprise an application for a smart phone, e.g., iphone, thereby eliminating the separate wrist band etc.

In yet another embodiment, the packaging may contain educational information regarding the harmful effect of prolonged sun exposure or outdoor activities in excessive heat. The package information can advise what time of day is most dangerous in terms of exposure to the sun and outdoor activities. The educational materials of the packaging may include how to set the timer correctly or temperature alarm. It will be appreciated that this educational information can facilitate wise use of the capabilities of the apparatus.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What I claim is:

1. An apparatus for monitoring exposure to temperature or sunlight comprising
   a) an apparatus protective cover,
   b) an ambient temperature measuring component in communication with a chronometer and an alarm wherein the measured ambient temperature is conveyed to the chronometer or alarm;
   c) an ambient temperature measuring component control for selecting one or more temperature settings that can be communicated to the chronometer or alarm;
   d) a chronometer control component for setting the time of day and setting the duration of planned exposure, and
   e) an alarm control component and a timer component.

2. The apparatus of claim 1 further comprising solar powered panels wherein the solar powered panels react to exposure to sunlight and can communicate sunlight exposure to one or more of the ambient temperature measuring components, the chronometer or the alarm.

3. The apparatus of claim 1 further comprising a display component wherein the display component can display one or more of the following;
   a) ambient temperature;
   b) preselected temperature settings;
   c) time;
   d) elapsed duration of exposure to temperature or sunlight;
   e) un-elapsed duration of exposure to temperature or sunlight
   e) alarm setting;
   f) alarm status; and
   g) control settings.

* * * * *